(12) United States Patent
Winbush, III

(10) Patent No.: US 8,976,253 B2
(45) Date of Patent: Mar. 10, 2015

(54) CAMERA USER CONTENT SYNCHRONIZATION WITH CENTRAL WEB-BASED RECORDS AND INFORMATION SHARING SYSTEM

(76) Inventor: Amos Winbush, III, New York, NY (US)

(*) Notice: Subject to any disclaimer, the term of this patent is extended or adjusted under 35 U.S.C. 154(b) by 462 days.

(21) Appl. No.: 13/363,977

(22) Filed: Feb. 1, 2012

(65) Prior Publication Data

US 2012/0127328 A1 May 24, 2012

Related U.S. Application Data

(62) Division of application No. 12/645,806, filed on Dec. 23, 2009.

(51) Int. Cl.
*H04N 5/225* (2006.01)
*H04M 3/16* (2006.01)
*H04N 5/232* (2006.01)

(52) U.S. Cl.
CPC ........... *H04N 5/232* (2013.01); *H04N 5/23206* (2013.01)
USPC ....................................... 348/207.1; 455/412

(58) Field of Classification Search
CPC .......... H04N 2101/00; H04N 1/00278; H04N 2201/0084
USPC ........ 348/207.99, 207.1, 207.2, 211.1–211.4; 707/999.102, 609, 611, 612, 620, 621, 707/623; 709/203, 208, 230, 214; 455/412, 455/418, 414.1
See application file for complete search history.

(56) References Cited

U.S. PATENT DOCUMENTS

| | | | |
|---|---|---|---|
| 5,684,990 A | 11/1997 | Boothby | 395/619 |
| 5,832,489 A | 11/1998 | Kucala | 707/10 |
| 5,974,238 A | 10/1999 | Chase, Jr. | 395/200.78 |
| 6,000,000 A | 12/1999 | Hawkins et al. | 707/201 |
| 6,006,274 A | 12/1999 | Hawkins et al. | 709/248 |
| 6,034,621 A | 3/2000 | Kaufman | 340/825.44 |
| 6,295,541 B1 | 9/2001 | Bodnar et al. | 707/203 |

(Continued)

FOREIGN PATENT DOCUMENTS

WO WO 01/35211 5/2001
WO WO 2008/065482 6/2008

OTHER PUBLICATIONS

M. Butrico et al., "Enterprise Data Access from Mobile Computers: An End-to-end Story", *Proceedings, Tenth International Workshop on Research Issues in Data Engineering*, Feb. 27-28, 2000, San Diego, California. IEEE Computer Society, Los Alamitos, California, pp. 9-16.

(Continued)

*Primary Examiner* — Aung S Moe
(74) *Attorney, Agent, or Firm* — Ostrolenk Faber LLP

(57) ABSTRACT

A camera and another device synchronization system, apparatus, signaling, processor-readable medium, and method are provided. As part of a system or as an apparatus, the camera may include a user content synchronization module for automatically synchronizing image data stored as camera records by the camera with central records stored for the user by a central node remote from the camera, the camera records and the central records comprising at least one of photo images or video files, such that changed central record and camera records are update using the most recent records from the other source.

38 Claims, 13 Drawing Sheets

(56) References Cited

U.S. PATENT DOCUMENTS

| | | | |
|---|---|---|---|
| 6,308,201 B1 | 10/2001 | Pivowar et al. | 709/214 |
| 6,317,797 B2 | 11/2001 | Clark et al. | 710/5 |
| 6,377,958 B1 | 4/2002 | Orcutt | 707/200 |
| 6,457,062 B1 | 9/2002 | Pivowar et al. | 709/248 |
| 6,470,358 B1 | 10/2002 | Beyda et al. | 1/1 |
| 6,516,327 B1 | 2/2003 | Zondervan et al. | 1/1 |
| 6,671,757 B1 | 12/2003 | Multer et al. | 710/100 |
| 6,694,335 B1 | 2/2004 | Hopmann et al. | 707/624 |
| 6,901,415 B2 | 5/2005 | Thomas et al. | 1/1 |
| 6,901,434 B1 | 5/2005 | Lunsford et al. | 709/216 |
| 6,909,457 B1 | 6/2005 | Fukasawa | 348/211.11 |
| 7,031,722 B2 | 4/2006 | Naghian | 455/456.1 |
| 7,076,567 B1 | 7/2006 | Chasman et al. | 709/248 |
| 7,092,699 B1 | 8/2006 | Hefter | 455/414.1 |
| 7,209,955 B1 | 4/2007 | Major et al. | 709/207 |
| 7,526,768 B2 | 4/2009 | Schleifer et al. | 719/310 |
| 7,650,432 B2 | 1/2010 | Bosworth et al. | 709/248 |
| 7,933,296 B2 | 4/2011 | Augustine et al. | 370/503 |
| 7,962,575 B2 | 6/2011 | Glatt et al. | 709/219 |
| 7,983,682 B2 | 7/2011 | Halkka et al. | 455/445 |
| 8,081,963 B2 | 12/2011 | Aftab et al. | 455/419 |
| 8,090,402 B1 | 1/2012 | Fujisaki | 455/556.1 |
| 8,103,718 B2 | 1/2012 | O'Shea et al. | 709/203 |
| 8,392,850 B2 * | 3/2013 | Nakagawa et al. | 715/838 |
| 8,503,984 B2 * | 8/2013 | Winbush, III | 455/414.1 |
| 2002/0087622 A1 * | 7/2002 | Anderson | 709/203 |
| 2002/0169830 A1 | 11/2002 | Mild et al. | 709/203 |
| 2002/0174382 A1 | 11/2002 | Ledford et al. | 714/30 |
| 2002/0194207 A1 | 12/2002 | Bartlett et al. | 1/1 |
| 2003/0139175 A1 | 7/2003 | Kim | 455/419 |
| 2003/0182327 A1 | 9/2003 | Ramanujam et al. | 707/204 |
| 2003/0187938 A1 | 10/2003 | Mousseau et al. | 709/206 |
| 2003/0220966 A1 | 11/2003 | Hepper et al. | 709/203 |
| 2004/0131282 A1 * | 7/2004 | Yoshida et al. | 382/312 |
| 2004/0172423 A1 | 9/2004 | Kaasten et al. | 707/201 |
| 2004/0205286 A1 * | 10/2004 | Bryant et al. | 711/1 |
| 2005/0037787 A1 | 2/2005 | Bachner et al. | 455/502 |
| 2005/0044165 A1 | 2/2005 | O'Farrell et al. | 709/213 |
| 2005/0050043 A1 * | 3/2005 | Pyhalammi et al. | 707/6 |
| 2005/0073389 A1 | 4/2005 | Chandley | 340/5.31 |
| 2005/0102329 A1 | 5/2005 | Jiang et al. | 707/204 |
| 2005/0131957 A1 | 6/2005 | Watkinson | 1/1 |
| 2005/0186989 A1 | 8/2005 | Cocita | 455/558 |
| 2005/0191998 A1 | 9/2005 | Onyon et al. | 455/419 |
| 2005/0234864 A1 * | 10/2005 | Shapiro | 707/1 |
| 2005/0251540 A1 | 11/2005 | Sim-Tang | 707/202 |
| 2005/0262097 A1 | 11/2005 | Sim-Tang et al. | 707/10 |
| 2005/0262146 A1 | 11/2005 | Grace et al. | 707/104.1 |
| 2006/0031541 A1 | 2/2006 | Koch et al. | 709/229 |
| 2006/0041603 A1 | 2/2006 | Paterson et al. | 707/204 |
| 2006/0085429 A1 | 4/2006 | Wener et al. | 709/206 |
| 2006/0094419 A1 | 5/2006 | Katou | 455/425 |
| 2006/0101064 A1 | 5/2006 | Strong et al. | 707/102 |
| 2006/0112413 A1 * | 5/2006 | Ando et al. | 725/105 |
| 2006/0149794 A1 | 7/2006 | Ylinen | 707/203 |
| 2006/0168351 A1 | 7/2006 | Ng et al. | 709/248 |
| 2006/0173954 A1 | 8/2006 | Maeda et al. | 709/203 |
| 2006/0174017 A1 | 8/2006 | Robertson | 709/229 |
| 2006/0174203 A1 * | 8/2006 | Jung et al. | 715/751 |
| 2006/0184591 A1 | 8/2006 | Backholm et al. | 707/204 |
| 2006/0189348 A1 | 8/2006 | Montulli et al. | 348/371 |
| 2006/0206533 A1 | 9/2006 | MacLaurin et al. | 707/200 |
| 2006/0206583 A1 | 9/2006 | Hill | 709/218 |
| 2006/0218224 A1 | 9/2006 | Agrawal et al. | 709/201 |
| 2006/0234679 A1 | 10/2006 | Matsumoto et al. | 455/411 |
| 2006/0276168 A1 | 12/2006 | Fuller, Jr. et al. | 455/404.2 |
| 2007/0014277 A1 | 1/2007 | Ebbesen et al. | 370/351 |
| 2007/0021112 A1 | 1/2007 | Byrne et al. | 455/419 |
| 2007/0037585 A1 | 2/2007 | Shim | 455/456.1 |
| 2007/0038857 A1 | 2/2007 | Gosnell | 713/165 |
| 2007/0072624 A1 | 3/2007 | Niemenmaa et al. | 455/456.1 |
| 2007/0100978 A1 | 5/2007 | Levi et al. | 709/223 |
| 2007/0117574 A1 | 5/2007 | Watanabe | 455/456.1 |
| 2007/0120980 A1 * | 5/2007 | Jung et al. | 348/207.1 |
| 2007/0149208 A1 | 6/2007 | Syrbe et al. | 455/456.1 |
| 2007/0162517 A1 | 7/2007 | Teegan et al. | 1/1 |
| 2007/0180075 A1 | 8/2007 | Chasman et al. | 709/223 |
| 2007/0250645 A1 | 10/2007 | Meadows et al. | 709/248 |
| 2007/0255854 A1 | 11/2007 | Khosravy et al. | 709/248 |
| 2007/0294306 A1 * | 12/2007 | Toutonghi et al. | 707/200 |
| 2007/0298761 A1 | 12/2007 | Bani Hani | 455/404.2 |
| 2008/0114855 A1 | 5/2008 | Welingkar et al. | 709/217 |
| 2008/0115226 A1 | 5/2008 | Welingkar et al. | 726/28 |
| 2008/0120369 A1 | 5/2008 | Gustavsson | 348/222.1 |
| 2008/0162501 A1 | 7/2008 | Tysowski et al. | 707/100 |
| 2008/0162597 A1 | 7/2008 | Tysowski et al. | 707/204 |
| 2008/0192129 A1 * | 8/2008 | Walker et al. | 348/231.2 |
| 2008/0233919 A1 | 9/2008 | Kenney | 455/411 |
| 2009/0037484 A1 | 2/2009 | Ireland | 707/200 |
| 2009/0044128 A1 | 2/2009 | Baumgarten et al. | 715/738 |
| 2009/0082441 A1 | 3/2009 | Czarnik | 514/517 |
| 2009/0138526 A1 | 5/2009 | Linkert et al. | 707/201 |
| 2009/0144434 A1 | 6/2009 | Tian et al. | 709/228 |
| 2009/0150569 A1 | 6/2009 | Kumar et al. | 709/248 |
| 2009/0177800 A1 | 7/2009 | Gidron et al. | 709/248 |
| 2009/0182821 A1 | 7/2009 | Allen et al. | 709/206 |
| 2009/0201908 A1 | 8/2009 | Gidron et al. | 370/350 |
| 2009/0203402 A1 | 8/2009 | Aftab et al. | 455/557 |
| 2009/0210454 A1 | 8/2009 | Sagar et al. | 707/201 |
| 2009/0247134 A1 | 10/2009 | Jeide et al. | 455/414.2 |
| 2009/0282125 A1 | 11/2009 | Jeide et al. | 709/217 |
| 2009/0307281 A1 | 12/2009 | McCarthy et al. | 1/1 |
| 2010/0157020 A1 * | 6/2010 | Choi et al. | 348/47 |
| 2011/0149086 A1 * | 6/2011 | Winbush, III | 348/207.1 |
| 2011/0151837 A1 * | 6/2011 | Winbush, III | 455/412.1 |
| 2011/0196826 A1 | 8/2011 | Retief et al. | 707/621 |
| 2012/0127328 A1 * | 5/2012 | Winbush, III | 348/207.1 |

OTHER PUBLICATIONS

"Open Source Group Calendaring: GCTP and OpenFlock", *Proceedings of the 4th Annual Linux Showcase & Conference*, Atlanta, Georgia, USA, Oct. 10-14, 2000.

B. Lee et al., "Performance Analysis of SyncML Server System Using Stochastic Petri Nets", *ETRI Journal*, vol. 26, No. 4, Aug. 2004.

A. Jönsson et al., "SyncML—Getting the Mobile Internet in Sync", *Ericsson Review*, No. 3, 2001.

Wikipedia contributors. "Mobileme." Wikipedia, The Free Encyclopedia, Aug. 12, 2008. Web. Feb. 10, 2012.

Wikipedia contributors. "Exchange ActiveSync." Wikipedia, The Free Encyclopedia, Feb. 1, 2012. Web. Feb. 10, 2012.

\* cited by examiner

1. DELETEcam list is formed by parsing XML from the Web. (Will also test if Service can be accessed BEFORE taking the time to scan the cam).
2. Records are deleted from camera.
3. FSCL is created by iterating over records on the camera.
4. FSCL and oldFSCL-DELETEcam are compared to detect deletions on camera which creates the DELETEqueue.
5. Records are deleted from Web.
   (At this point all the deletions are accounted for on both sides, so now we only have to consider files that are relevant.)
6. In lieu of a full GETcompare from the Web, in some cases we can just substitute the oldFSCL for the GETcompare.
6a. If oldFSCL doesn't exist: GETcompare = XML from the Web.
6b. If oldFSCL exists: GETcompare = oldFSCL - DELETEqueue.
6c. If oldFSCL exists, but it's only partial since different Settings were chosen last time:
    GETcompare = old FSCL + type specific GETcompare of the missing types.
7. If GETcompare = oldFSCL then also perform a NEWcompare which returns recently undeleted items.
8. FSCL is compared to the GETcompare and items are moved to the GETqueue or POSTqueue if applicable. (Ignore any record types that are not currently selected in Settings).
9. GETqueue-failed_GETqueue+FSCL is then saved to a file for use as "oldFSCL" next time.
10. GETqueue and POSTqueue are processed, performing their respective functions.

Fig. 5

CAMERA USER CONTENT SYNCHRONIZATION WITH CENTRAL WEB-BASED RECORDS AND INFORMATION SHARING SYSTEM

CROSS REFERENCE TO RELATED APPLICATIONS

The present application is a divisional of U.S. patent application Ser. No. 12/645,806, filed Dec. 23, 2009, the contents of which are incorporated herein by reference.

FIELD OF THE INVENTION

The present application is in the field of user content management and synchronization for cameras and camcorders with user records maintained at a central node, such as at a web server, and porting and sharing data content among other devices.

BACKGROUND OF THE INVENTION

The immense popularity of cameras and camcorders has resulted in ever-increasing quantities and types of data that are being stored on cameras and camcorders. Such data includes photo data and other image data, video files and video records, and other content stored for the user at the camera or camcorder as well as at other types of handheld portable device content data.

Digital cameras, camcorders and other video camera equipment store vast amounts of video data. Users often rely on the camera or the camcorder to store their photo images or video files, including potentially difficult to replace or precious photos and video records. Thus, if the camera or camcorder becomes damaged or lost, or if the memory card or other storage medium in the camera, video recording device or camcorder becomes damaged or lost, then the user's data may be irreplaceably gone. Also, if the user purchases a second camera or video recorder and wishes to view photos or videos previously captured on the first camera or video recorder, the user would have to typically undertake a cumbersome process of uploading the photos or video files from the first camera or video recorder to a device such as a desktop or laptop computer and then to download the files from the device to the second camera or video recorder. Also, sometimes the user may wish to view recent photos or videos taken on the camera or camcorder at home on a desktop or at a friend's house away from home, and it may be cumbersome to upload "manually" the images or the videos each and every time a new image or video is captured by the camera. In a similar vein, while traveling the user may wish to view images or videos captured while the camera is being recharged or may wish to view them on a larger monitor or display than is available on a typical digital camera or camcorder. Also, a user may wish to view on his/her camcorder photos that were captured and stored on a camera, or vice versa, or may wish to share photos, video files or other content with a family member's or friend's device without having to load "manually" content from one device to another via a third intermediary device, such as a desktop/laptop computer, or by first uploading to some web-based storage location.

SUMMARY OF THE INVENTION

A camera and another device synchronization system, apparatus, signaling, processor-readable medium, and method are provided. As an apparatus, the invention may include a camera that includes a user content synchronization module for automatically synchronizing image data stored as camera records by the camera with central records stored for the user by a central node remote from the camera, the camera records and the central records comprising at least one of photo images or video files, the user content synchronization module including: a synchronization controller configured to initiate a current synchronization operation; a state comparator configured to identify, as a changed central record, any central records for the user changed, deleted or added since a last synchronization operation, and to identify, as a changed camera record, any camera records changed, deleted or added since the last synchronization operation, the last synchronization operation being a synchronization operation performed most recently prior to the current synchronization operation by the camera; the state comparator being further configured to determine whether the changed central record is a corresponding record to the changed camera record, the corresponding record being a record that refers to a different version of the same record than another record, and to identify, as a most recently modified record, only one record of a group consisting of the changed central record and the changed camera record; and a command generator configured to generate a command queue comprising a command to update based on the most recently modified record, the command being a command sent to the central node to update the central records for the user when the most recently modified record is the changed camera record, and the command being a command to the camera to update the camera records when the most recently modified record is the changed central record.

Such a camera of claim may also be provided as or include a camcorder for recording video data. The user content synchronization module may include a web access module configured to communicate with the central node via the internet, for example, content data from the central node may be transmitted as XML data.

The camera may include a wireless communication device configured to connect wirelessly with a Wi-Fi port remote from the camera, and may include a portal for a wired connection with an internet connection device having a web browser for connecting to the central node via internet, for example using a general packet radio service (GPRS) to communicate via web 99.

The synchronization controller may initiate automatically the current synchronization operation upon connection with the internet connection device, may initiate automatically the current synchronization operation regularly after a predetermined time period.

The user preference module may receive and store a user-specified time period, wherein the predetermined time period is the user-specified time period and the predetermined time period is at least 30 minutes.

A module, such as a processor-readable medium incorporating a program of instructions configured to run at the central node and configured to manage the central node during the current synchronization is also contemplated.

Such a program at the central node may maintain a deleted camera records folder comprising camera records deleted during the current synchronization operation and recallable upon user command. In the alternative, the program at the central node may maintain only thumbnail representations of the deleted camera records for the deleted camera records folder. Also, the program at the central node may initiate the current synchronization operation by transmitting a synchronization operation start command to the user content synchronization module. Further, the program at the central node may include an off-line storage module to synchronize the central records with a second user device, the second user device being a device other than the camera. The program at the central node may also include a remote wiper that signals the user content synchronization module to delete all camera records.

The camera may also include a user preference module that receives and stores a user designation of a selected set of camera records, the selected set of camera records being exempt from deletion or modification at the camera during the current synchronization operation. The user preference module may receive and store a user selection of a thumbnail synch mode or a full record mode, wherein upon selection of the thumbnail synch mode, during the current synchronization operation the command generator is configured to store only a thumbnail representation of every camera record that remains in the camera after the current synchronization operation, and wherein the upon selection of the full record mode, during the current synchronization operation the command generator is configured to store an entire camera record of all camera records that remains in the camera after the current synchronization operation.

The user content synchronization module may include a thumbnail recall to generate, upon a user selection of a thumbnail representation, a request for the central node to transmit to the camera the central record corresponding to the thumbnail representation for viewing the central record on the camera.

A processor-readable medium incorporating a program of instructions configured to run on an internet connection device having a web browser for connecting to the central node via the internet is also described, such that the program of instructions manages the internet connection device to connect automatically with the camera via a wired or a wireless connection.

The synchronization controller may initiate automatically the current synchronization operation upon connection with the internet connection device.

In such a camera, during the current synchronization operation, the command generator may generate a thumbnail representation of every camera record that remains in the camera after the current synchronization operation. During the current synchronization operation, the command generator may retain a thumbnail representation of every camera record deleted from the camera during the current synchronization operation.

The synchronization operation module may include a thumbnail recall unit that generates, upon a user selection of a thumbnail representation, a request for the central node for transmitting to the camera a full image representation of the central record corresponding to the thumbnail representation for viewing the central record on the camera.

A position relay module for the camera is also contemplated, that would transmit to the central node for storing in the central records for the user a current position of the camera. The position relay module may transmit the current position at a time of the current synchronization operation. The position relay module may retrieve the current position from a GPS unit integrated with, or in wired or wireless communication with, the camera.

A location-based information module for the camera is also described, for providing guide information to the user based on a current position of the camera. The current position of the camera may be detected based on GPS information or based on scene recognition of a scene viewed by the camera.

Also described is a system, an apparatus, signaling or a set of signals, a processor-readable medium, and a method for synchronizing user content between a first user device and a second user device over the internet via a central node. As a system, the invention includes a first user content synchronization module positioned in the first user device and configured to synchronize automatically the user content uploaded via the internet to the central node from the second user device; a second user content synchronization module positioned in the second user device and configured to synchronize with the first user device by uploading via the internet the user content to the central node; a third user content synchronization module positioned at the central node and configured to transmit automatically to the first user device the user content; and a user preference module configured to receive a user command for initiating synchronization by activating the second user content synchronization module.

The user preference module may include a processor-readable medium incorporating a program of instructions positioned in the first user device or in the second user device.

The user preference module may initiate the synchronization automatically and immediately each time user content is received at the second user device, or may initiate the synchronization with regularly occurring frequency.

The first user content synchronization module may perform a current two-way synchronization operation such that a first device file of the user content stored at the first user device is updated automatically by any corresponding user content added, changed or deleted at the central node, and such that a central file of user content stored at the central node is updated automatically by any corresponding user content added, changed or deleted at the first user device.

Also, the first user content synchronization module may perform the current two-way synchronization operation each time the first device file or the central file is added, changed or deleted. The first user content synchronization module may perform the current two-way synchronization operation with regularly occurring frequency.

In addition, in such a system the second user content synchronization module may perform a current two-way synchronization operation such that a second device file of the user content stored at the second user device is updated automatically by any corresponding user content added, changed or deleted at the central node, and such that a central file of user content stored at the central node is updated automatically by any corresponding user content added, changed or deleted at the second user device.

For example, the first user device may be a mobile communication device, and the second user device may be a television, a gaming device, and/or a mobile communication device.

The first user content synchronization module may also include a virtual device controller to receive user commands for controlling the second user device and to transmit signals via the central node for controlling the second user device based on the user commands received.

Thus, the first user device may be a mobile communication device and the second user device may be a television.

In addition, the first user device may be a mobile communication device, the second user device may be a gaming device, and the first user content synchronization module may include a virtual device controller to receive user commands for controlling the second user device and to transmit signals via the central node for controlling the second user device based on the user commands received.

Other features and advantages of the present invention will become apparent from the following description of the invention with reference to the accompanying Drawings.

BRIEF DESCRIPTION OF THE DRAWINGS

FIG. 5 is an example of a set of operations for implementing a synchronization operation according to an aspect of Applicant's invention as illustrated in FIGS. 1-3.

With reference to the Drawings, features of the invention are described in the detailed description section.

DETAILED DESCRIPTION OF EMBODIMENTS OF THE INVENTION

Figure 1:
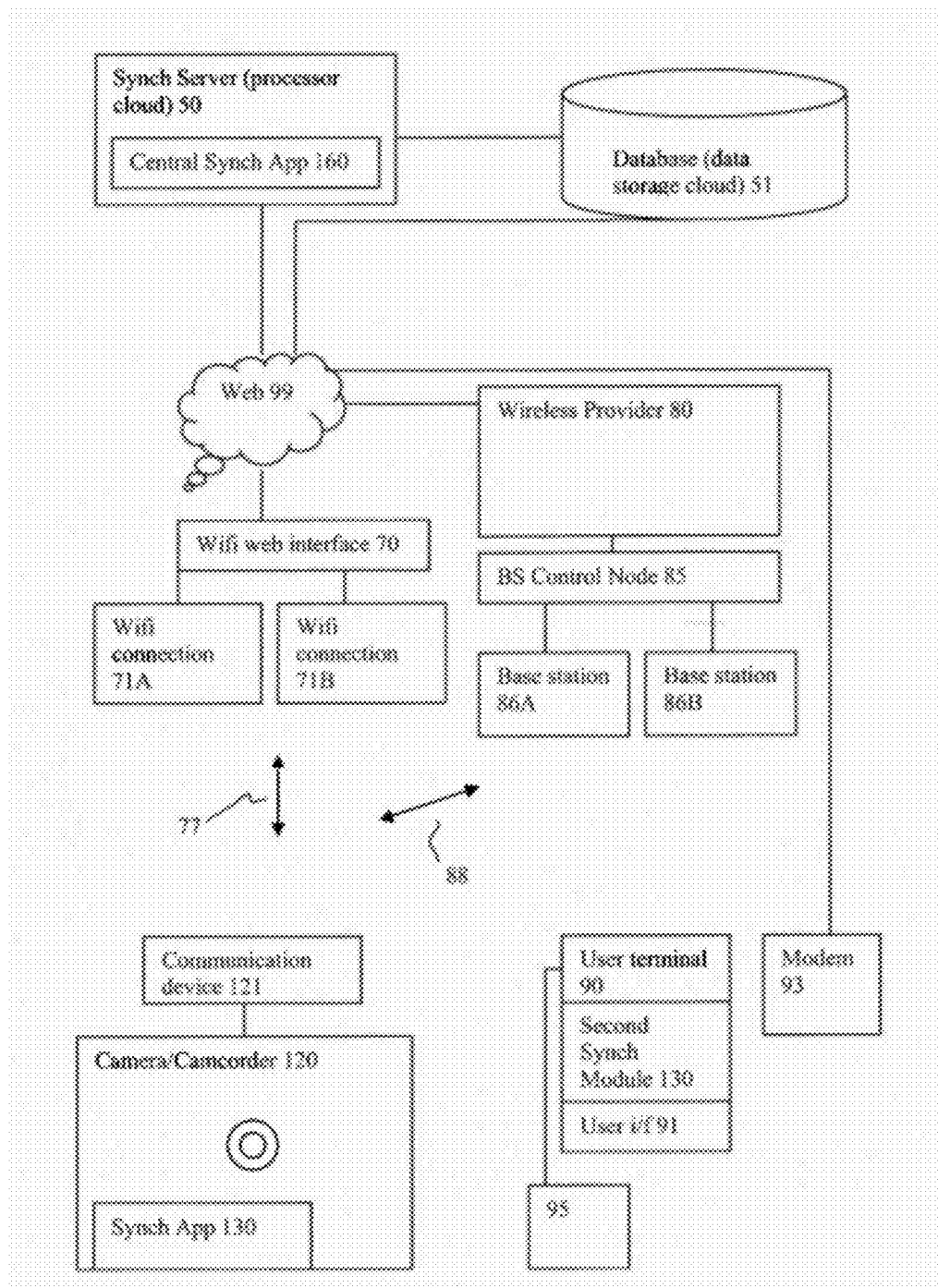
FIG. 1 is a schematic overview of a system illustrating the camera/camcorder connected to the synchronization server, according to an aspect of Applicant's invention.

FIG. 1 illustrates structures that may participate in a camera or video recorder/camcorder synchronization operation according to an embodiment of Applicant's invention. As illustrated in FIG. 1, the synchronization application 130 may be a software product residing in a recorded medium of a camera or a camcorder 120 for coordinating a synchronization operation with a synchronization server 50 at the central node via web 99. Synchronization application 130 may be implemented as software, hardware or firmware, using a medium that is insertable into the device, such as a card, or a combination of the foregoing. Synchronization application 130 may be included on the camera/camcorder 120 when purchased or may be separately purchased as off the shelf software or as a card medium, or may be downloaded in software form from a vendor of the camera/camcorder 120 or from an independent vendor that sells only the synchronization application 130 but does not sell the camera/camcorder. Such a synchronization application 130 may be included in the retail purchase price of the camera or camcorder 120 or may be purchased for a lump sum payment for a monthly or other periodic subscription fee.

Synchronization application 130 may initiate the synchronization operation at the expiration of a predetermined time period, at a particular time of the day, week, month etc. or at a particular hour every day. The synchronization application 130 includes a synchronization controller 131 that initiates the synchronization application. Further, the synchronization operation may be commenced by the user or, according to an aspect of Applicant's invention the central synchronization application 160 may "push" initiate the synchronization operation by transmitting a synch operation request to the synchronization controller 131 of the synchronization application 130 in the camera/camcorder 120. Also, synchronization controller 131 may initiate the synchronization operation upon the occurrence of an event, such as upon the addition of new user content, or modification or deletion of existing user content, or upon the occurrence of user action such as snapping a photograph or activating the record function of the video camera or camera/camcorder 120.

Camera/camcorder 120 may communicate with the central node via a Wi-Fi connection 71a, 71b if the camera/camcorder 120 is equipped with a Wi-Fi communication module or chip or via base station 85A, 96B of a wireless cellular network. Alternatively, or in addition to the wired or wireless connection to the Wi-Fi communication and/or the wireless cellular network, the camera/camcorder 120 may be connected using a wired or wireless connection to an internet connection device such as a communication device 121. Such a device 121 may be a desktop, laptop, television unit or a handheld device or another communication terminal that includes a modem that is able to communicate with the internet. Camera or camcorder 120 may have one or more network interfaces, for example, one or more network interface cards (NIC) or a network controller, and the network interface may include a personal area network (PAN) interface providing bluetooth, UWB (ultrawideband network), IEEE 802.15.4 (for example ZigBee) or the like functionality for communication with device 121. For example, GPRS may be used to communicate via the web 99.

Figure 3:
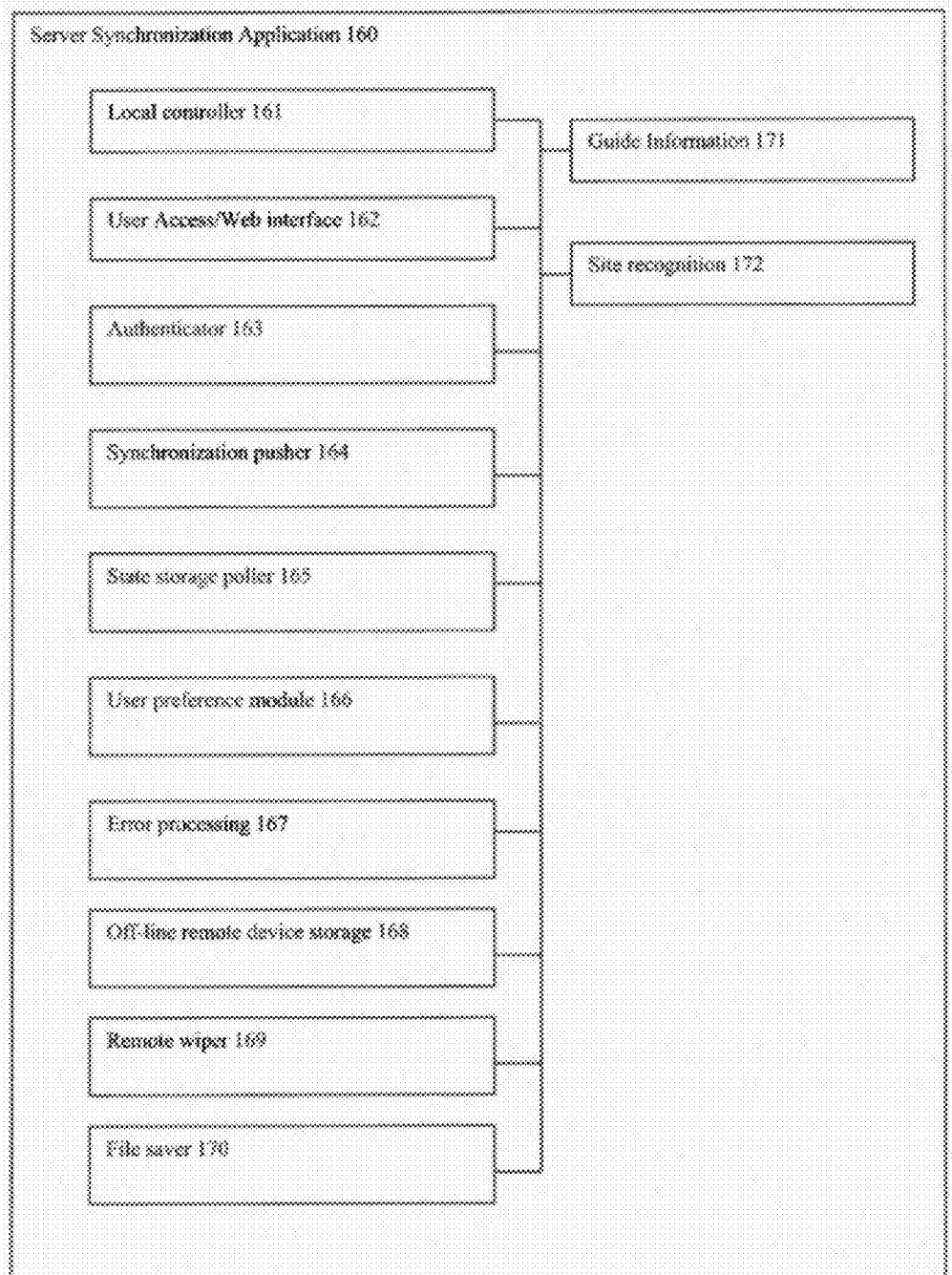
FIG. 3 illustrates a server synchronization application that is run at the synchronization server 50 according to an aspect of Applicant's invention.
Figure 4:
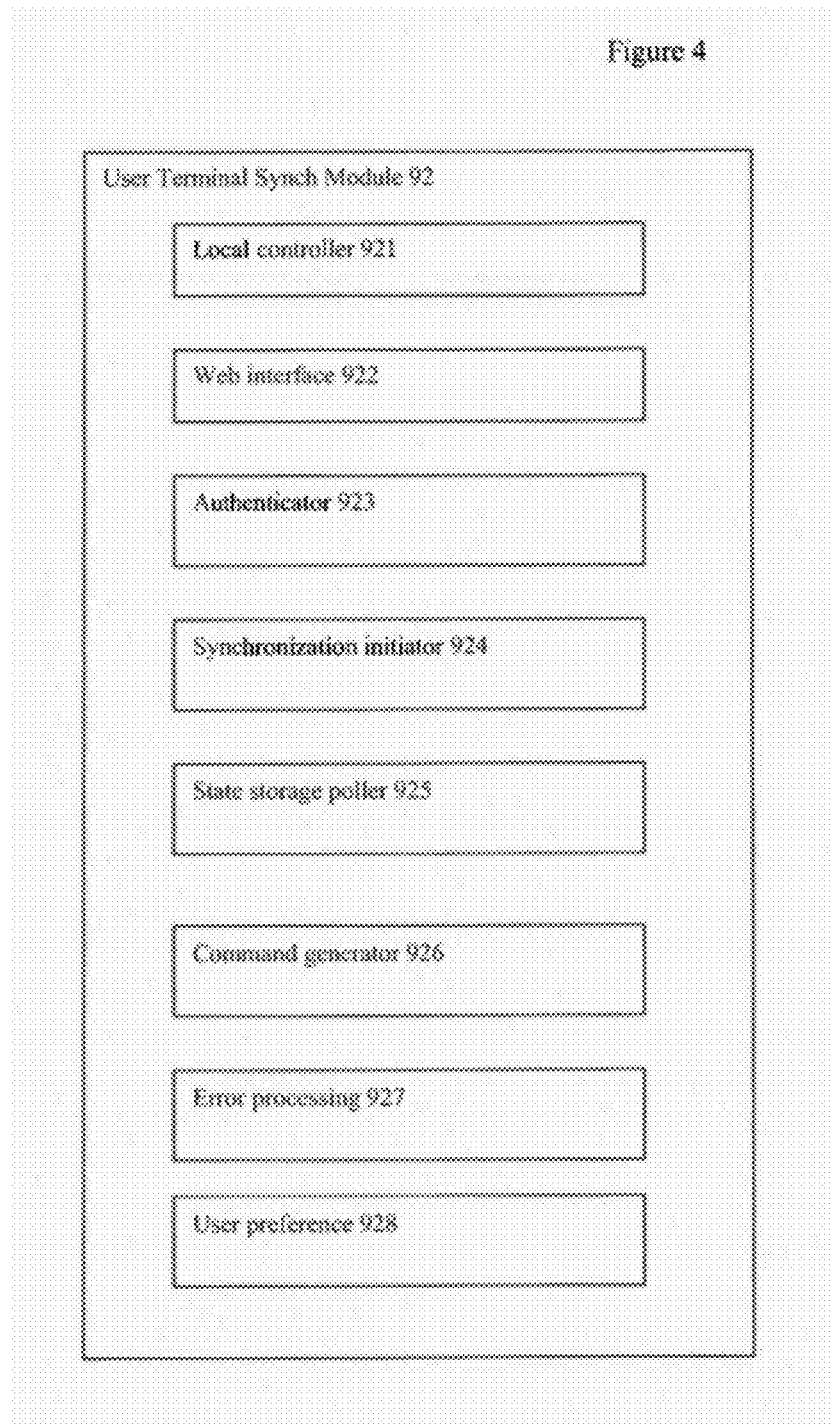
FIG. 4 illustrates a server synchronization run at another user device according to an aspect of Applicant's invention.

Also, the synchronization operation may be automatically commenced when the camera/camcorder 120 is connected to the communication device 121. According to an aspect of Applicant's invention, all synchronization operations may be performed using HTTP and the OSI model as a packet based RESTful paradigm. The synchronization server 50 may be implemented as a processor cloud that includes a series of processors and may include a synchronization application 160 that provides functionality for synchronization at the central node, components of which are shown in FIG. 3. The synchronization server 50 may also be attached to a database 51, which too may be implemented as a data storage cloud, or a set of servers connected to the web 99.

Synchronization application 130 may include a user preference module 132 that accepts user-specified instructions for commencing the synchronization operation, so that the user may be empowered to select to have the synchronization operation start automatically at a certain time of the day, week or month, upon the expiration of a certain interval of time, upon connection to the communication device 121, upon connection to the web 99, when the Wi-Fi communication port of the camera/camcorder 120 is in a Wi-Fi hotspot enabling communication with Wi-Fi connection 71a, 71b, or the like. When the synchronization operation is commenced by the synchronization application 130, an authentication may be carried out by authenticator 133 in communication with authenticator 163 of synchronization server 50 of the central node.

Figure 7:
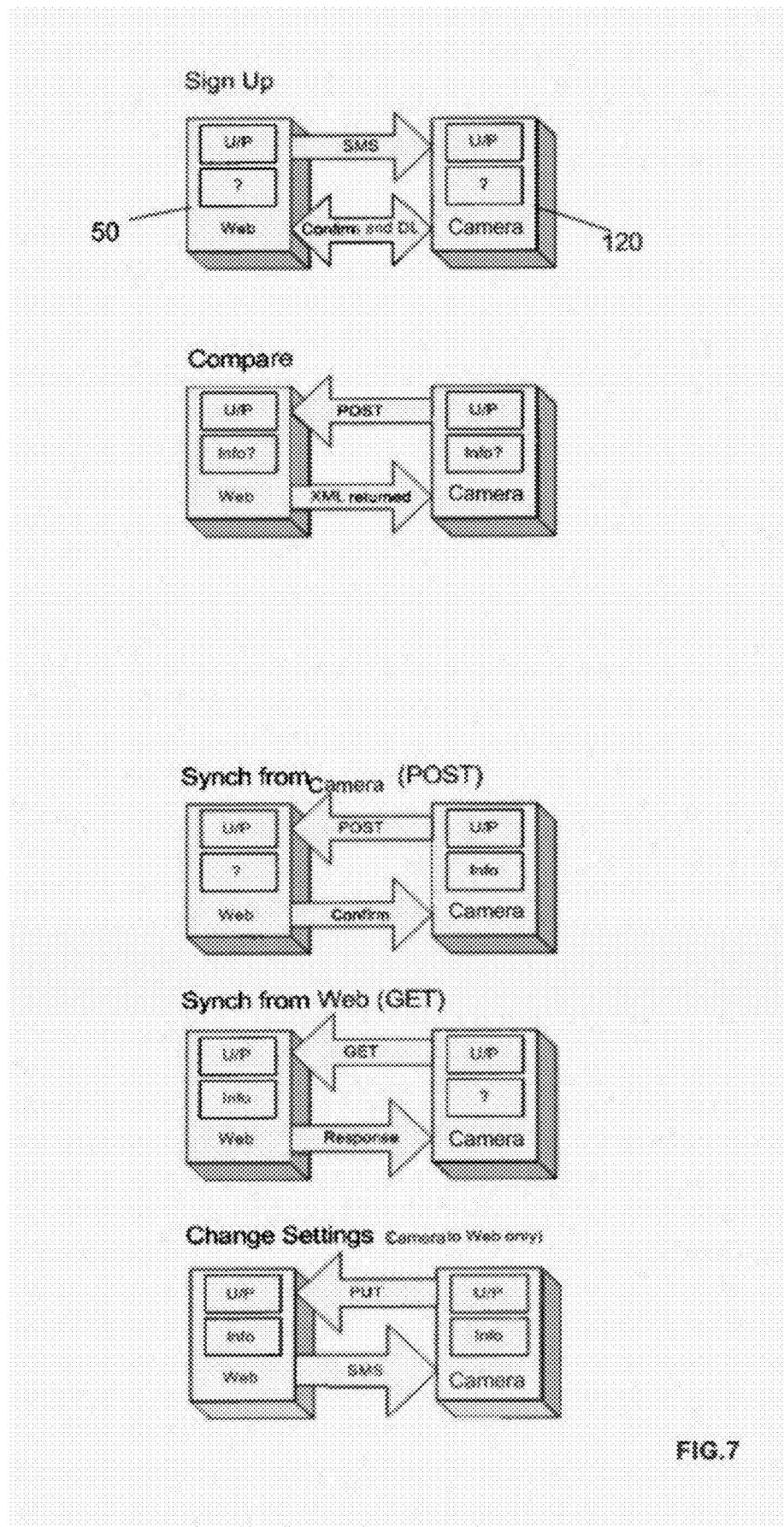
FIG. 7 illustrates a communication between the camera and the central node for authenticating the camera and for the two-way synchronization operation according to an aspect of Applicant's invention.
Figure 11:
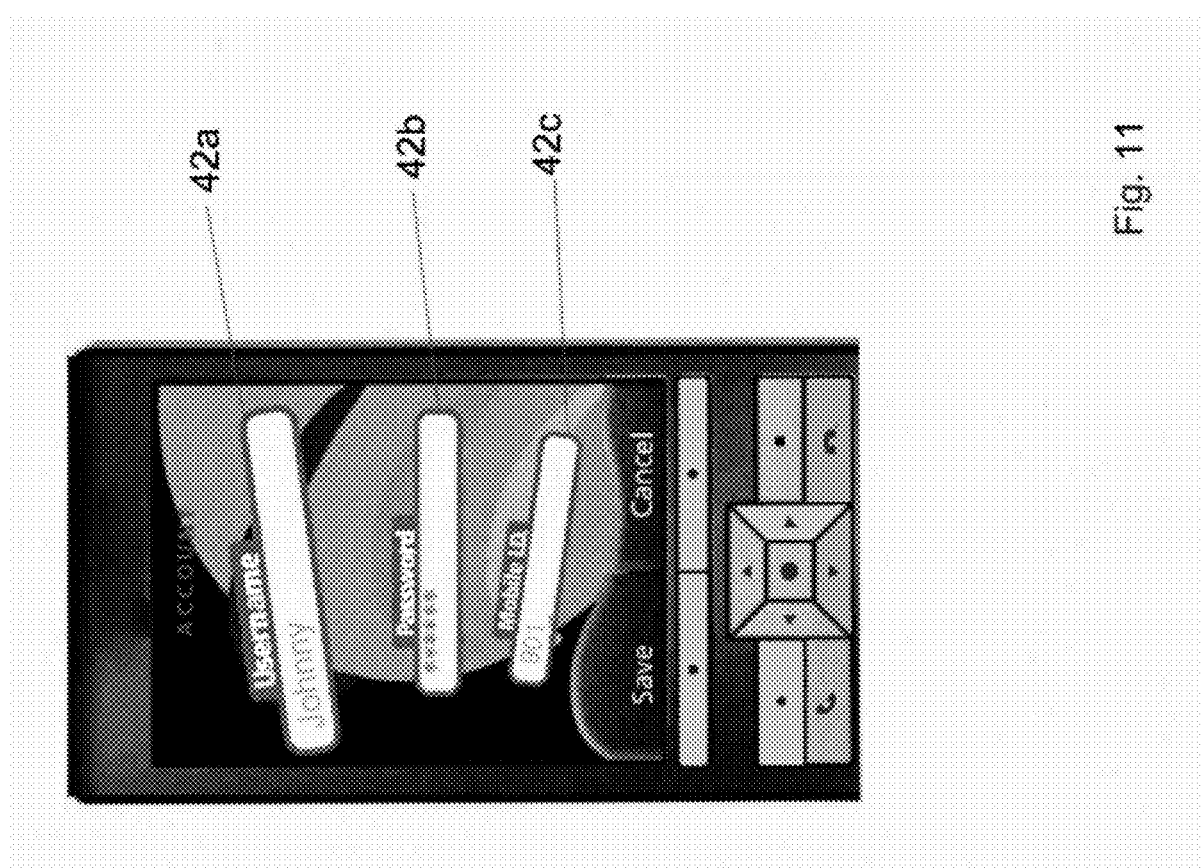
FIGS. 11 and 12 illustrate features of the graphical user interface provided at the camera 20, according to an aspect of Applicant's invention.

FIG. 7 is a high-level illustration of the authentication stage and the synchronization operation according to an aspect of Applicant's invention, performed with command issued by the synchronization application 130 residing on the camera/camcorder 120. As illustrated in FIG. 11, when setting up camera or camcorder 120 for synchronization with the central node, the user may be prompted to enter a user name 42a and password 42b and to enter a mobile ID 42c identifying this camera or camcorder 120 for the user. Camera or camcorder 120 may be assigned a unique ID, or, the subscribing user may be assigned a unique ID and camera or camcorder 120 may be assigned a secondary device ID, for example device ID 1-99, associated with the unique ID of the mobile user. Thus, many devices may be associated with the user for synchronization with the central node, and each camera/camcorder or other device may thus share the same user name and password for the convenience of the user. In the alternative, for added security as illustrated in FIG. 11 the user may be asked to provide the user name 42a and/or the password 42b associated with the user name and/or the mobile ID 42c in addition to the user name 42a and password 42b, each time the synchronization operation is to be commenced. An authentication of camera or camcorder 120 is performed by authenticator 133, which ensures that camera or camcorder 120 is associated with a subscriber of the service provided by the synchronization server 50. For example, a public key and private key approach may be used for authenticating the camera or camcorder 120 by authenticator 133. Other authentication schemes are well known and may be used in addition to or instead of the one described.

Although synchronization server 50 is shown as a unit distinct from wireless provider 80, according to an aspect of Applicant's invention, wireless carrier or network provider 80 may provide the synchronization service and may thus house or provide synchronization server 50. According to an aspect of Applicant's invention, user preference module 132 may provide an automatic default setting for a timing of synchronization operations, and user preference module 132 may have a minimum threshold, for example five minutes, that cannot be overridden by the user that must elapse between synchronization operations. Also, a thirty minute or an hour minimum interval setting may be provided as the pre-set minimum time as the lowest acceptable setting that may be set by the user for the user preference module 132.

Synchronization application 130 of camera/camcorder 120 may perform a two-way synchronization operation with synchronization server 50 of the central node by comparing any newly added, deleted, manually changed or automatically updated camera records stored in camera/camcorder 120 with newly added, deleted, manually changed, or automatically updated camera records for the user maintained at synchronization server 50 of the central node. As part of the synchronization operation, synchronization application 130 may identify records of camera/camcorder 120 that correspond with the records for the user maintained at synchronization server 50 of the central node and generate a command queue for updating, based on the most recent records, the corresponding records maintained at the other device. That is, when a photo image or video file, or a version or an edited duplication of a photo image or video file, of the camera/camcorder 120 is deemed to be newer or to have been deleted, added or changed more recently than a corresponding photo image or a video file, or a version or an edited duplication of a photo image or video file, maintained at synchronization server 50 of the central node, then the corresponding record of synchronization server 50 will be updated. Conversely, when the photo image or video file, or a version or an edited duplication of a photo image or video file, maintained at synchronization server 50 is found to be more recent than the corresponding photo image or video file, or a version or an edited duplication of a photo image or video file, maintained at camera/camcorder 120, then the corresponding record maintained by camera/camcorder 120 will be updated as part of the automatic synchronization operation. Or if a corresponding photo, video file or other record is found to have been more recently deleted than that photo, video file or other record may be deleted also on the remaining device. It will be understood that other types of synchronization operations may be performed to achieve the synchronization discussed herein.

Figure 6:
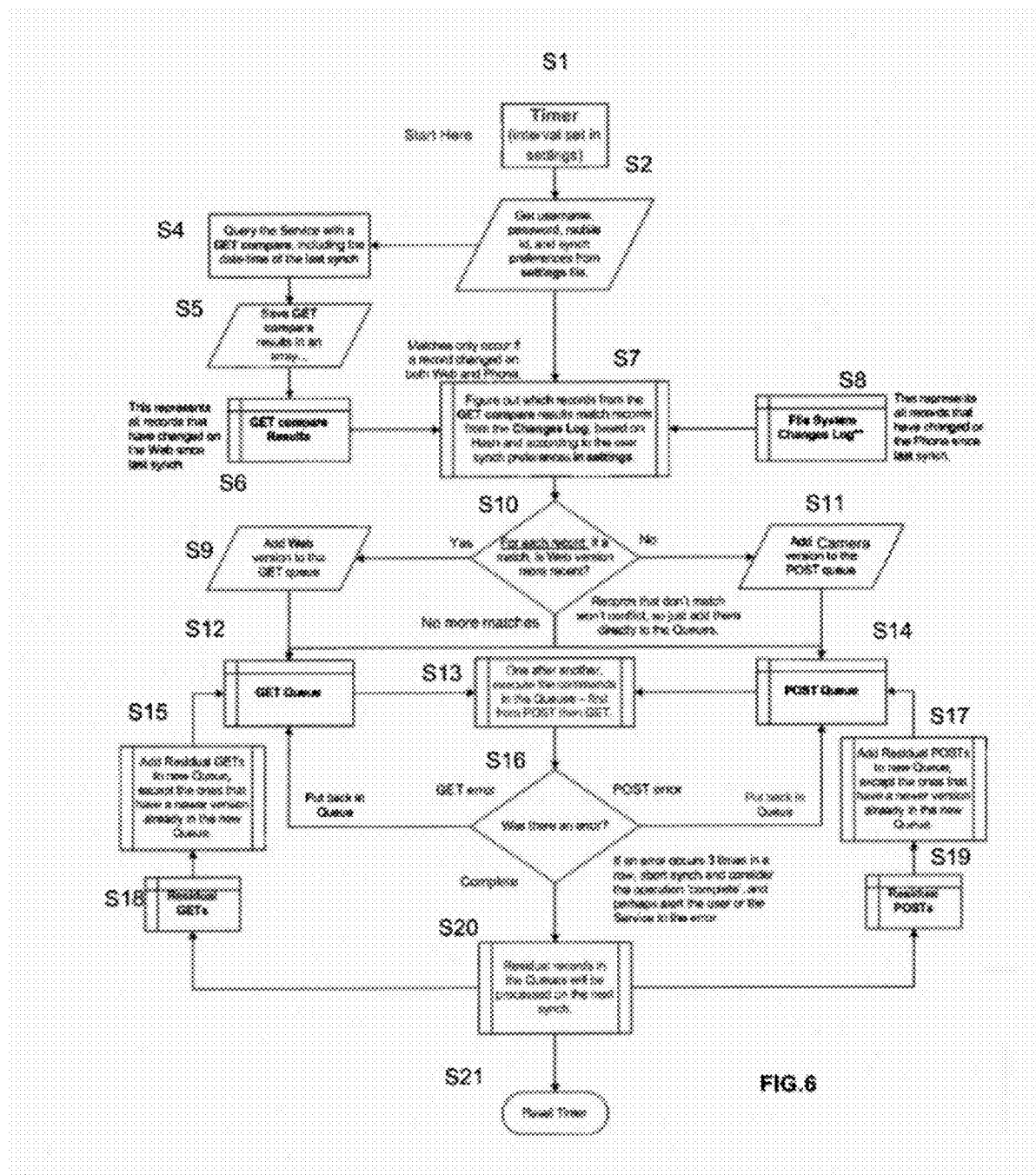
FIG. 6 is a flow chart illustrating an example of steps that may implement a two-way synchronization operation according to an aspect of Applicant's invention.

FIG. 6 is a flow chart illustrating an example of a series of steps performed as part of a synchronization operation according to an aspect of Applicant's invention. At S1 a timer indicates that a certain time has elapsed or a particular time of the hour or the day that has been predetermined to be the synchronization time has been reached and a synchronization operation is begun at S2. As an alternative to initiation of the synchronization operation commenced by the synchronization application 130 residing in the camera/camcorder 120, or in addition to the times of synchronization operation initiated by the synchronization application 130, according to an aspect of Applicant's disclosure the central synchronization application 160 residing at the synchronization server 50 may also commence in the synchronization operation. Accordingly, the central synchronization application 160 of the synchronization server 50 would signal the synchronization controller 131 or the synchronization application 130 to commence the synchronization operation. The subscriber's user name, password and the ID of the camera/camcorder are obtained from memory of the camera/camcorder 120 for authenticating the camera/camcorder 120 by the synchronization server 50. In addition to or instead of offering a password from a memory of the camera/camcorder, the user may be asked to provide a password. Further, synchronization preferences provided by the user and stored by the user preference module 132 may also be obtained to control what fields of data are to be synchronized. For example, the user may wish to synchronize only certain fields of data of the user content but not other fields. The user preference profile may provide a default setting in which all user content stored is automatically synchronized unless the user chooses a different setting.

At step S4 the central node is requested to provide all fields of user data that have been changed since the most recent synchronization operation and the data/time of the most recent change or update of each field that has been changed. GETcompare may be a method call requesting a list of all records associated with the requesting camera/camcorder 120 of the user and maintained at the central node that have been changed, added or deleted since the most recent synchronization operation.

FIG. 5 illustrates a list of operations performed by the synchronization application 130 as part of a synchronization operation written out as pseudo code. With reference to FIG. 5, FSCL, the File System Changes Log, is a representation of all the user records of interest on the camera/camcorder 120. oldFSCL is a list of all records on the camera/camcorder 120 as they existed before the current synchronization operation. Thus, since most devices do not keep a list of recently deleted files, the FSCL file is compared with the oldFSCL file to determine which file or files needs to be deleted by adding it to the DELETEqueue. Thus, the DELETEqueue is a list of records to be deleted from the central node, as determined by comparing the oldFSCL with the FSCL. Similarly, DELETE-cam is a list of all records that are recently deleted on the central node. They are deleted via a DELETE command. The GETqueue is a list of records that are to be retrieved from the central node. Then, FSCL is compared with the GETcompare/oldFSCL. The POSTqueue, on the other hand, is a list of records to be posted using the POSTcommand to the central node. This list is determined by comparing the FSCL with the GETcompare/oldFSCL. Alternatively, all user content data from the central node may be requested and stored temporarily by the mobile terminal.

At S5 in FIG. 6, fields that have been changed may be stored temporarily by the synchronization application 130 in the camera/camcorder 120. Similarly, at F8 a File System Changes Log is generated or read out. This log represents all fields of the user content stored on the camera/camcorder 120 that have changed since the most recent synchronization operation.

Such a File Systems Changes Log may be generated in several ways, for example, a background process may be running that adds each file system change in the camera/camcorder 120 to the log, or at run time during the synchronization operation (or just before the synchronization operation) the files may be scanned and those fields that have changed since the most synchronization operation may be added to the log. The latter approach may be more applicable for the first synchronization operation and would be less susceptible to a catching changed field if the program had been turned off.

At S7 the corresponding fields of the records obtained from the central node and the file system changes log are determined. Such corresponding fields of the user record may be obtained, for example, if each field of user content is indexed by a searchable key. Then, at S10, for each corresponding record a determination is made as to which version, the version that had been maintained by the central node or the version that had been maintained by the camera/camcorder is the most recent version. This determination is made, in this example, based on the date/time stamp associated with each field of the user data of the GETcompare results and the File System Changes Log. If at S10 the version maintained at synchronization 50 is determined to be more recent, then a command is generated and added to a command queue to update content stored by the camera/camcorder 120. Alternatively, if the camera/camcorder 120 version is determined to be more recent for that field of the user data content, then a command is generated and added to the command queue to request that synchronization server 50 update the data stored at the central node, including by the database or the data storage cloud 51 (S11).

As shown in S13 the commands on the command queue are executed one after another. As shown in the flowchart of FIG. 6, two command queues may be generated, one at S12 containing the GET commands for obtaining data of the central node and updating the camera/camcorder 120 user content, and one at S14 containing the POST commands for updating the central node user content. At S16 a determination is made as to whether there was an error. If a GET error was made then the command is reposted to the GETqueue and if a POST error is made then the command is put back on the POSTqueue S14. It will be understood that while described using method calls of one computer language, many other types of command syntax are possible. Also, while the synchronization operation is described with reference to the approach illustrated in FIG. 6, it will be readily understood that many other types of synchronization operation are known that will make possible the update of a field of user data that has been changed by a user, in order to automatically update with new information that has been added, or to remove data has been deleted, to a less recent corresponding field.

At S20 commands effecting residual records are added to queues of residual commands, a residual get queue is generated at S18 and a residual post queue is generated at S19 and these command queues are added to respective command queues performed at the next synchronization operation, except that if a field effected by such residual command is more subsequently updated after the current synchronization operation then residual commands are not executed. At S21 the timer for starting the next synchronization operation is reset, such that, for example if a synchronization operation is set to be commenced every hour than the timer is set for an hour starting from the completion of the current synchronization operation. According to an aspect of Applicant's invention, user preference module 132 may provide an automatic default setting for a timing of synchronization operations, and user preference module 132 may have a minimum threshold, for example five minutes, that must elapse between synchronization operations. Also, a thirty minute or an hour minimum interval setting may be provided as the minimum time that may be set by the user by user preference module 132.

A basic outline of steps executed during a synchronization operation is illustrated in FIG. 7. At "Sign Up" an SMS (short message service message) or other such communication may be sent to the camera/camcorder 120 with a link to install the application. At "Compare" camera/camcorder 120 sends a command to the central node (Web), which replies with XML data required to synchronize. At "Synch from Camera" camera/camcorder 120 passes data to the central node, with the central node-transmitting confirmation. At "Synch from Web" the camera/camcorder 120 is requesting data from the central node. "Change Settings" is provided to update user account details from the camera/camcorder 120.

Figure 8:
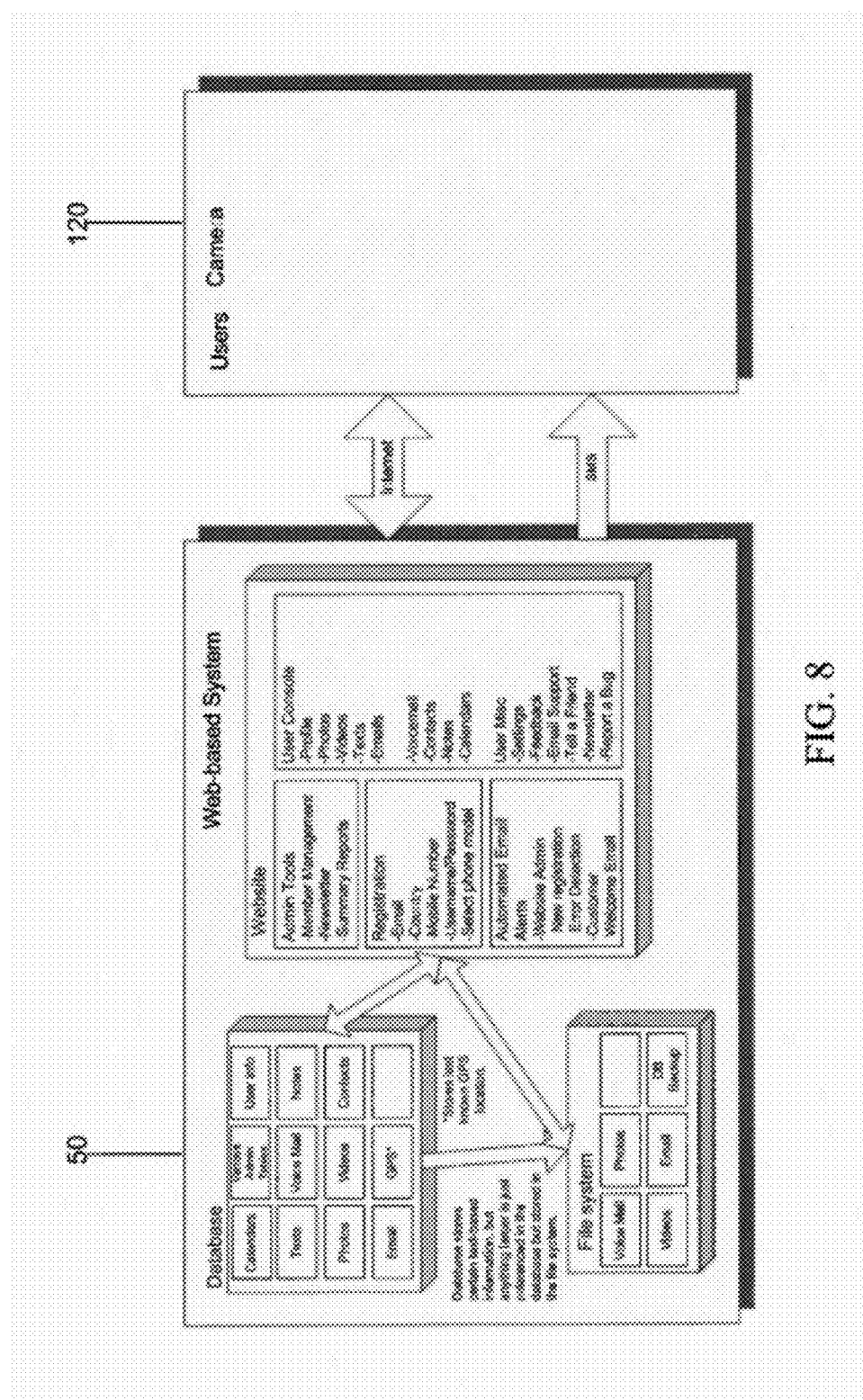
FIG. 8 illustrates records of the user files that may be maintained by the central node according to an aspect of Applicant's invention.
Figure 9:
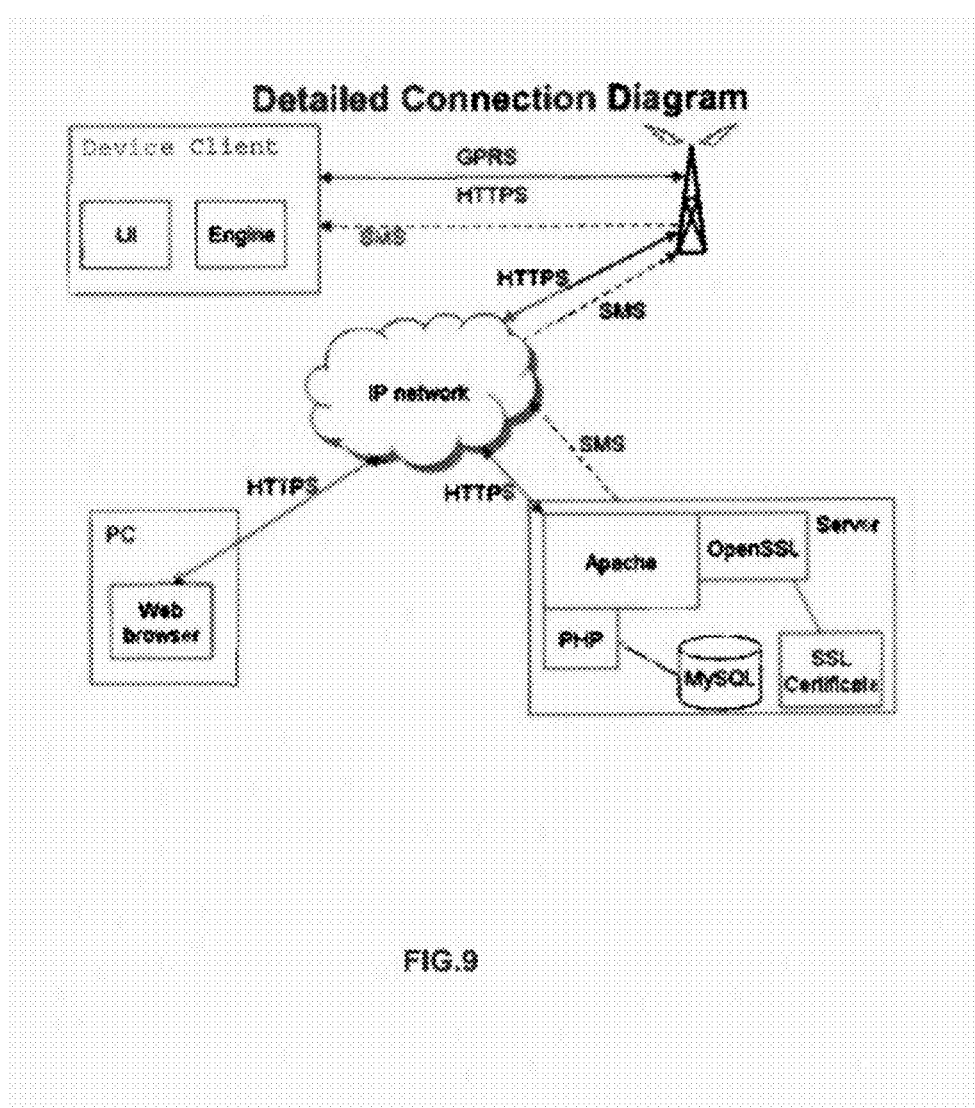
FIG. 9 is a connection diagram showing an example of connections between a camera, a personal computer, such as a desktop or a laptop, and the central node, according to an aspect of Applicant's invention.
Figure 10:
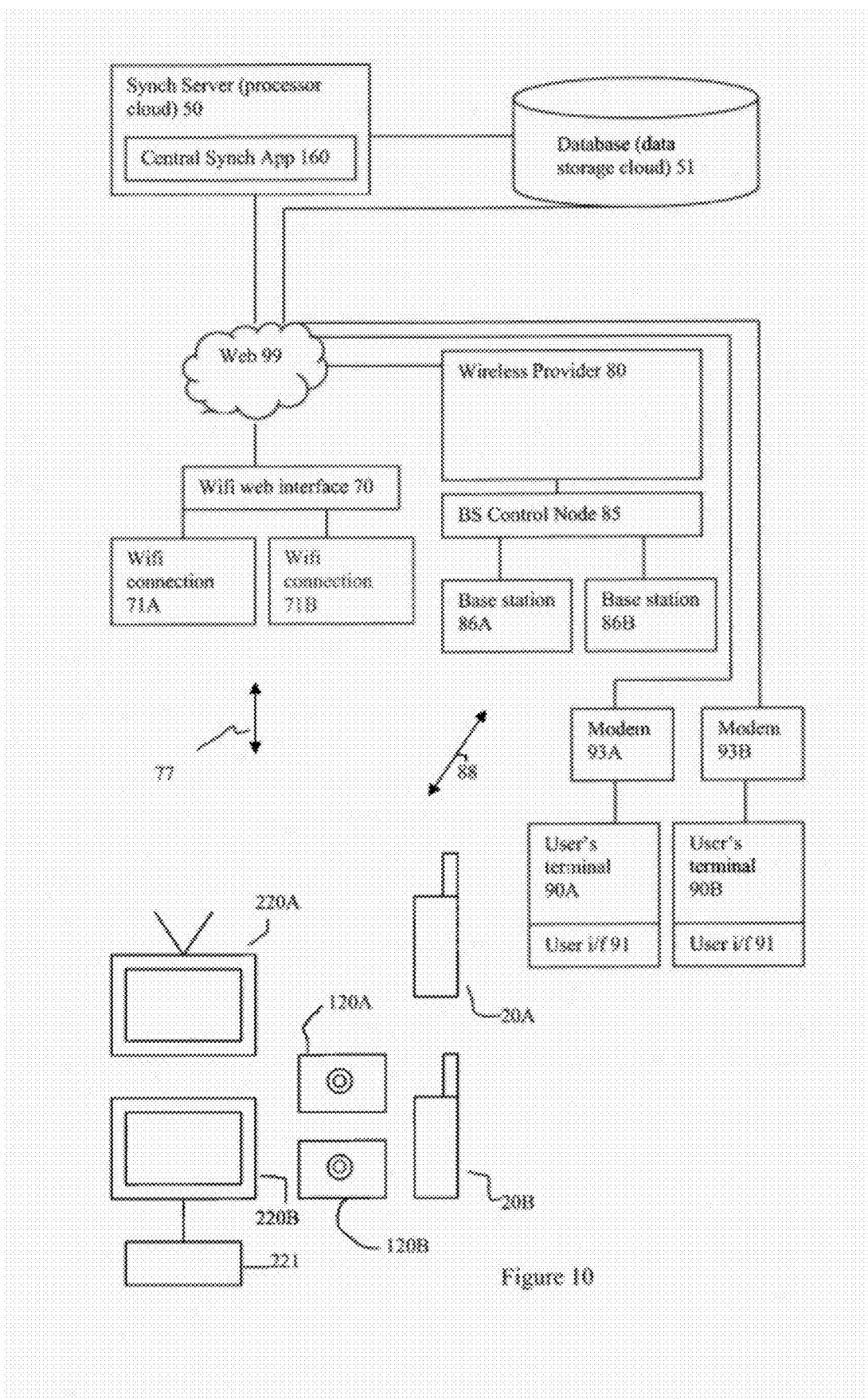
FIG. 10 illustrates other devices that may be connected or synchronized via the central node, according to an aspect of Applicant's invention.

FIG. 8 illustrates a scheme for organizing user content data at the central node (sometimes referred to as the web-based system) in relation to camera/camcorder 120. FIG. 9 illustrates an example of a communication scheme between the client device and a central node server communicating via HTTPS via web 99, and also illustrates a PC terminal 90 that may be used by the subscriber to monitor data stored.

Central synchronization application 160 of synchronization server 50 of the central node may include a file saver 170 that automatically saves all photo images or video files deleted from camera/camcorder 120 as part of the current synchronization operation and that generates a special folder for such saved files. Thus, the user may wish later to recall such a deleted file from the saved file folder. Such a feature could be useful in case the user mistakenly deleted the photo images or video files at camera/camcorder 120 and then during the synchronization operation such deleted files would have been permanently removed from both camera/camcorder 120 and synchronization server 50.

Synchronization application 130 at camera/camcorder 120 may include user preference module 132 that receives a user designation of a first set of images that the user may also wish to keep stored at camera/camcorder 120, and the user may wish to exempt all such images or video records from being deleted or modified during synchronization operations. For example, the user may have a photo displayed as a screen saver, or a group of photos to be shown at camera/camcorder 120 for friends that the user wishes to exempt from synchronization or from deletion.

In addition, the user may wish to select a thumbnail mode, in which during the synchronization operation all photo images or video files that remain in camera/camcorder 120 after the synchronization operation are maintained only as thumbnails at the camera. Depending on the size of the memory of camera/camcorder 120, a very high number of such thumbnail representations could be stored at the camera, thus greatly increasing the number of images that may be held. Further, synchronization application 130 may include a thumbnail recall 137 that accepts a user selection of a selected thumbnail representation stored on the camera/camcorder 120 and generates a request transmitted to the synchronization server 50 for providing the full photo image or full video file corresponding to the thumbnail representation selected by the user. Thus, at any time the user may view the photo image or video file at camera/camcorder 120 returned from the synchronization server 50. Such a full photo image may be stored by camera/camcorder 120 indefinitely, only while it is being viewed or played at the camera/camcorder 120 after it is received or for some user-defined period. In this way, a "virtual memory" of camera/camcorder 120 may be extended a great deal by the use of only thumbnail representations maintained at camera/camcorder 120.

In the alternative, user preference module 132 may accept the user selection of a full representation synchronization mode, such that the synchronization operation leaves an entire photo image or video file for all the records of the camera that remain in the camera after the current synchronization operation.

In addition, the photo images, video files or the thumbnail representations may be organized or may be accessible using user-specified filters such as date, time or location of capture of the photo image or video file. In addition, the photo images, video files or thumbnail representations may be tagged and separated into groups based on associations of records thought desirable by the user. Thus, the user may wish to tag for a custom folder all photo images, video files or a thumbnail representation of a certain person, place or the like. In a similar vein, the user may select for synchronization with the central node only photo images or video files contained within a particular folder or those tagged and separated into a particular group, grouped by, for example date/time of capture, or location of capture, person or persons depicted in the photo image or video file, type of photo (e.g. portrait, day or night, flash or no flash, landscape, black and white or color, or the like).

Also, user preference module 132 may allow the user to select a mode in which photo images or video files deleted from the camera during the synchronization operation are nevertheless maintained in a special thumbnail folder of camera/camcorder 120. Thus, camera/camcorder 120 nevertheless could retain a thumbnail representation of photo images or video files that were automatically deleted or changed as part of the synchronization operation in the special thumbnail folder.

Further, according to a further aspect of the disclosure, if the user loses the camera/camcorder 120 the user may initiate a remote data wipe of all photo images, video files, thumbnail representations, user preferences or other user content or information stored in the camera/camcorder 120 by initiating a data wipe operation at the synchronization server 50. Thus, central synchronization application 160 may provide a command issued from local controller 161 for deleting all records stored on camera/camcorder 120 upon a special instruction received via web 99 from the terminal 90 of the user. Thus, the user may visit synchronization server 50, for example, via the web interface, in case camera/camcorder 120 becomes lost or damaged and initiate a request from the synchronization server 50 to delete all user records stored by the camera/camcorder 120. According to an aspect of the disclosure, such a "data wipe" operation would terminate further synchronization operations between camera/camcorder 120 and the central node so as to prevent loss of data held for the user at the central node. In this way, if the camera/camcorder 120 is found by an unscrupulous person, all user data stored at the camera/camcorder 120 will have been deleted. However, should the user obtain a replacement camera/camcorder 120, then user data stored at the central node can be downloaded to the replacement camera/camcorder 120 through an ordinary synchronization operation or using a special synchronization operation initiated by the user without burdening user without having to replace the data "manually."

Also, camera 120 may be connected via a wired or wireless connection or maybe integrated with a GPS device and may automatically transmit a position of the camera/camcorder 120 to synchronization server 50. Synchronization server 50 may store the location of camera/camcorder 120 and may manage a file that contains a running list of most recent camera/camcorder 120 locations. In addition, a location of camera/camcorder 120 may be obtained using methods other than a GPS device, for example, using Wi-Fi connection port 71A/71B triangulation or base station 86A/86B triangulation, or direct signaling provided by Wi-Fi connection 71A/71B or base station 86A/86B for informing of the location. For example, GPRS (general packet radio service) may be used as a means of communication via the web 99 and the position of the camera/camcorder 120 may be performed accordingly. Also, location also may be determined based on a scene recognized by camera/camcorder 120 using scene recognition software.

Similarly, the user may use another terminal 90, such as desktop terminal, laptop, television unit, portable communication device or a handheld device to view, or manage photo images or video files maintained at the synchronization server 50 of the central node. Thus, the user may wish to add, delete, change manually, such as using a photo manipulation or video file manipulation application, the photo images and video files maintained at the synchronization server 50 of the central node. Such changes, additions or deletions would then be reflected in the camera 120 content after the next synchronization operation.

Terminal 90 may include a monitor as part of the physical user interface, such as a CRT television monitor, flat screen monitor, OLED, LCD, LED or plasma display, front projection or rear projection display or the like. Similarly, camera/camcorder 120 may have one or more such monitors or displays integrated therewith or integrated with communication device 121.

Also shown in FIG. 1 is auxiliary device 95, which may be a keyboard, computer, gaming device, headphone connected to user terminal 90 using a wired or wireless connection. Thus auxiliary device 95 may have its own display that controls and its own storage such that data stored at user terminal 90 may also be saved at auxiliary device 95.

FIG. 11 illustrates a graphical user interface for interacting with camera/camcorder 120 for authenticating the user and specifying the device associated with the user.

Figure 12:
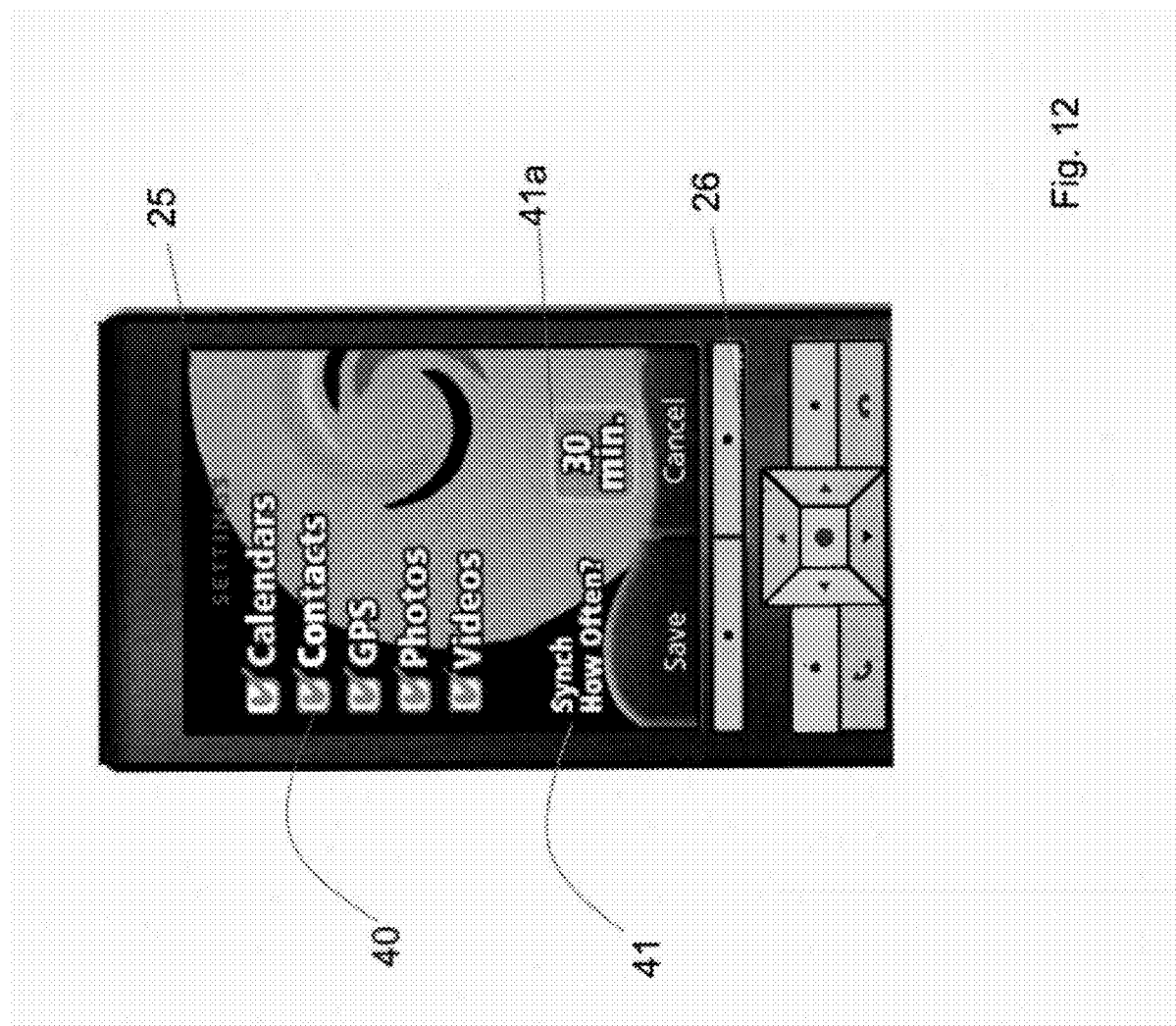
Figure 13:
FIG. 13 illustrates features of the graphical user interface provided at the central node for web-based access, according to an aspect of Applicant's invention.

FIG. 12 illustrates a graphical user interface for interacting with camera/camcorder 120 to allow the user to specify what types of files to synchronize with the central node. Thus, user may wish to choose settings 25 such as videos 40 for synching or may select more than one or all of such settings. Also, FIG. 12 illustrates that user is prompted by a prompt such as "SynchHowOften?" prompt to input a response such as "30 minutes" as response 41a. User may interact with camera/camcorder 120 via the arrow keys and buttons provided at 26, using "soft buttons" provided on interactive display, using a trackball or mouse, using voice commands recognized by specialized voice recognition software, via an interface provided by communication device 121 at which camera/camcorder 121 is "docked" or with which it is in wired or wireless communication, or the like.

Also shown in FIG. 1 is a database 51, which may be implemented as a data storage cloud, for storing user records. The synchronization server 50 may be implemented as a processor cloud. Database 51 may be connected directly to the synchronization server 50 or may be connected to a synchronization server 50 via web 99. The synchronization server 50 may be provided as a stand-alone service that is purchased or subscribed to by the user of the camera/camcorder 120, or the synchronization server 50 and the database 51 may be provided by the manufacturer or seller of the camera/camcorder 120 as part of the purchase of the camera/camcorder 120. Such services may be provided for an additional lump-sum payment or for periodic subscription fee.

Synchronization server 50 may be accessed by a parent or guardian to monitor user content of camera/camcorder 120 because the central node would automatically synchronize with camera/camcorder 120. Thus by accessing, for example, via a website synchronization server 50 of the central node, the parent could monitor the photo images or video files stored on the camera/camcorder 120. Also, synchronization server 50 may include user settings to control user content, such as porn filters or other filters for user content, and may flag or prevent the storage of all such objectionable content.

In addition, the user may interface using user interface 91 with user terminal 90, connected via the web 99 for communication with the synchronization server 50, and user terminal 90 may also store all or some of the photo images or video files stored on camera/camcorder 120. According to this aspect of the invention, during each synchronization operation, or following each synchronization operation between camera/camcorder 120 and synchronization server 50 of the central node, user terminal 90 may also be updated and synchronized with the most recent version of the photo images and video files.

In addition or in the alternative, user terminal 90 may have a separate synchronization application 130 that separately synchronizes with the central node at regular intervals or at other specified times so that the user terminal 90 maintains the most recent version of all photo images or video files. In addition, or in the alternative, user terminal 90 may be synchronized each time user terminal 90 is activated or each time user terminal 90 is connected to the web 99. User terminal 90 may also be connected to another device 95 via a wired or wireless connection, and this other device may be a television, a second camera or camcorder, a handheld device, a mobile communication, such as a cellular phone, notebook, or a tablet terminal, and all information that is monitored on the terminal 90 may also be monitored, or may be monitored exclusively, on monitored device 95.

Also contemplated is a camera-to-camera photo image or video file sharing feature. Two or more users may wish to share remotely photos or video files upon the request of one of the users. For example, a first user may wish to initiate a request to a second user to access all or some designated group of the photo images or video files of the second user. If the second user grants permission, then the first user is granted permission to view those photo images or video files. Such a request from the first user and such a response from the second user may be input using synchronization server 50 at the central node and transmitted to each camera or can be input to the camera/camcorder 120 and transmitted to the second camera directly or via the central node. Such a request may be made for a one-time share or may be a request to share automatically all such for user content in the future.

Also, a site recognition feature is contemplated in which people, companies, states, governments, organizations or other entities can submit various images, including photos or video files of certain locations or landmarks, that are of geographical, historical, political or other interest. When a user points camera 120 toward a landmark of geographic or historic significance, the camera may use recognition software to identify the landmark and a message can be provided to the user on the camera screen, with text identifying the name and other important information about the landmark. The recognition may be performed either using recognition software or based on a determination that the current location of the camera 120 is at or approximately at the location of the registered landmark of geographic or historical significance. The message to the user on the camera may be in the form of a text message or may be a semi-opaque overlay of the landmark. While described as a landmark or a building, it would be understood that such a landmark can consist of landscape of ecological or historical significance, such as a nature preserve or a park.

Similarly, the information uploaded and preset may be information of interest to the user about a particular location, building or landmark and when a determination is made that the camera 120 is at or near the landmark, the information could be presented to the user just as would be presented by a brochure or a tour guide. Also, other related points of interest nearby could be made available or presented to the user via camera 120.

Also contemplated is a system in which many such devices are all synchronized at the central node such that upon selection by the user of the device, or of types of content of a device, all such designated user content may be synchronized at the central node to all other selected devices or to any device designated by the user. Thus, the user may wish to view pictures or video data or recordings captured by camera 120A, 120B on the mobile device 20A, 20B, and in addition or instead, on the television 220A, 220B.

The camera may include a landmark guide information module 139D that stores information about various sites, such as landmarks or other geographic or architectural points of significance or sights and includes information, such as would be useful for a tourist or a visitor of the site, or information about neighboring sites to be recommended for the user, such as other similar or related landmarks, restaurants or hotels, airports or the like, which may be provided to the user in the form of textual information, textual marquis at the bottom of the camera screen or as an opaque or semi-opaque overlay over the site. For example, the overlay may include a picture or other image or representation of a building that is associated with or corresponds to the recognized site, taken during a historically significant time or taken from an advantageous or aesthetically pleasing perspective or angle. In the alternative, such information may be streamed from the central node based on the site recognized by the recognition software 139C at the camera 120A, 120B. Also, the camera may include a module for filtering photographs or video recordings, such as filtering such photos or video recordings by date, time or location of capture or according to whether the image or video file is of a person or a landscape or a group of people or whether it was taken at night or by day or in the U.S. or outside the U.S. or other such criteria.

Also, the user may also be able to tag each photo or video file with such indexing information so that such photos or video files may be associated together and recalled as a group or recalled individually based on a search entered by the user and keyed by such tagging information.

Also, synchronization may be performed automatically each time user content for any designated synchronized device is changed, updated, added or deleted. Such event-driven synchronization may be performed in addition to or instead of synchronization at set time intervals or at pre-specified times. Thus, the user may wish to perform synchronization with a device such as a camera 120A, 120B, which is less frequently used or for which data stored is less frequently changed, added or deleted, or for which content files include larger amounts of data and thus require more bandwidth and storage space, only upon the occurrence of a content changing event, such as the addition, deletion or the editing of user content. Also, the user may wish to port user data or other content immediately only in one direction between designated devices. For example, the user may wish to view television content received by the television 22A on the mobile terminal 20, but not to view content of the mobile device on the television 220A and thus, the user may set for only one way synchronization.

Also, while shown as mobile communication devices 20A and 20B, cameras 120A, 120B, televisions 220A, 220B and television auxiliary device 221, other types of devices may also be used to view synchronized content or to supply synchronized content. For example, such platforms may include printer devices, medical surgical equipment, electronic pens, radio devices, electronic shavers/electronic personal care device, lighting systems/fixtures, refrigerators microwave ovens, security systems (home or business), air conditioning systems, heating systems, electronic book readers, home or business entertainment systems, headphones, gaming devices, electronic billboards/signs, cook top stoves, electronic picture frames, elevators, electronic tables, dishwashers, washer/dryer laundry units, small to mid size kitchen appliances, electronic planners, electronic calendars, car computer systems and dashboard displays, wall mounted electric systems, aviation systems, boating computer systems, electronic toothbrushes, digital recorders, DVD player, blue ray players, cable-satellite set-top box, device remote control units, handheld "sky caddie" (golf device), GPS golf cart with or without "sky caddie" built in home/auto alarm systems, car rear camera/obstacle detector, portable automobile TV, on-board bicycle racer computer, landline phones, electronic doors, paper shredder, electric reclining chair, treadmills and workout bikes, vending machines, ticketing machines, toll/commuter fair machines or turnpikes pedometer built into shoe, cash register, coin counting machines, DVD renting units, self checkout machines.

For example, the user may wish to watch television content received at or stored at television 220A on mobile communication device or cellular telephone 20A or on camera 120A. Thus, the user may wish to initiate a porting of data received at or stored at television 220A via synchronization server 50 by initiating a one-way synchronization in which any new content received by television 220A is transmitted via the central node to the mobile communication device 20A and/or to the camera 120A. In addition, or in the alternative, user may initiate such one-way synchronization by setting a command at television 220A to transmit in real time, or upon the completion of receipt of an entire television program or other video file to the synchronization server 50 via the web 99. The synchronization server 50 would automatically forward such content to the mobile communication 20A and/or the camera 120A. In the alternative, synchronization server 50 may store any such television content or video file until the file is complete or the television program is finished uploading and then transmit the video file or television program to the mobile telephone 20A and/or to camera 120A.

Figure 2:
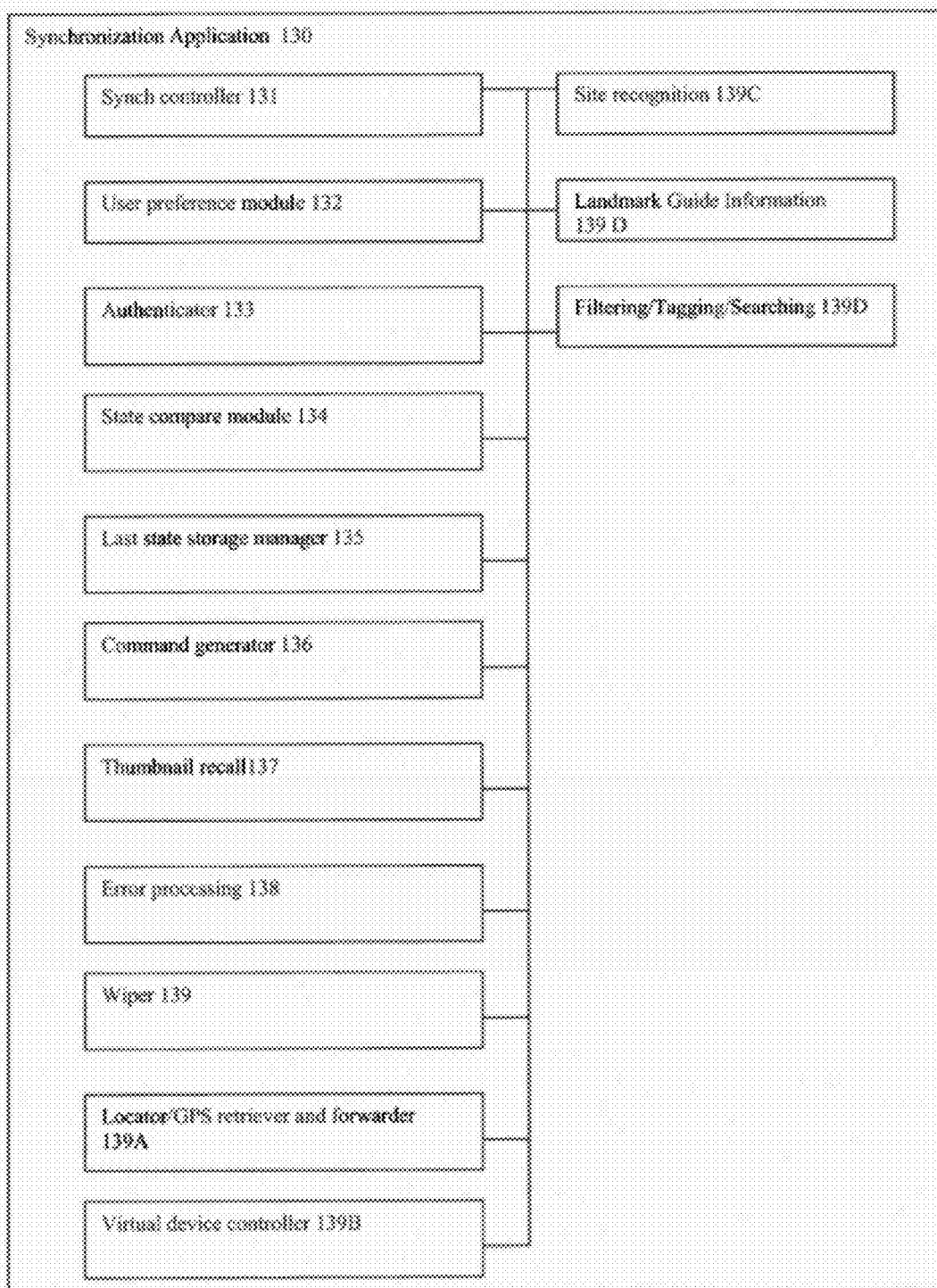
FIG. 2 illustrates a synchronization module or application run at the camera/camcorder, according to an aspect of Applicant's invention.

In addition, synchronization application 130, illustrated in FIG. 2 also may include a virtual device controller 139B provided in the mobile communication device 20A and/or camera 120A to receive user command intended for directing or controlling television 220A so that the user may be allowed to transmit commands via the central node to the television 220A from the mobile communication device 20A and/or camera 120A to change the channel, program a video recorder integrated with or provided separate from television 220A, change a reception frequency or timing of a transmission from television 220A, change a volume setting or the like. While described in the above-described example as a mobile communication device 20A or as a camera 120A, it would be understood that other devices may be provided for receiving the ported data, such as one or more of the devices above-listed.

Also, user may wish to view mobile communication user content on television 220A or other such device and may wish to add, change, update, or delete such user content or the communication device 20A. For example, user may wish to view picture data, video files, or other image data, or change or monitor contact information stored on mobile device 20A on camera 220A or on such other device. This may be accomplished by transmitting such mobile device content data via synchronization server 50 to the remote device 220A. This may be accomplished with some regular frequency, for example as part of a one-way or a two-way synchronization between mobile communication device 20A and television 220A, or when requested by a user of television 220A or such one-way or two-way synchronization may occur automatically each time any mobile communication data is added, changed, deleted or updated at the mobile communication device 20A.

Similarly, the user may wish to view and/or participate in a game played at a gaming device 221 connected with or integrated to television 220B from a remote location using the mobile communication device 20A and/or camera 120A. Thus, the user may wish to play a game currently playing on gaming device 221, and may also wish to send instructions for directing the ball or in other ways directing action in the game using the interface provided at mobile communication device 20A and/or camera 120A. Thus, virtual device controller 139B of synchronization application 130 may receive such user commands intended for directing action at a gaming device 221 and may then transmit them via synchronization server 50 over the web 99 to a gaming device 221 and/or to connected television 220B.

Thus, synchronization as described in the foregoing description and thumbnailing of picture and video files may provide for reduced reliance on the memory of the camera/camcorder 120 and/or may require a smaller memory of the camera/camcorder 120, and a more streamlined camera/camcorder 120 may be obtainable.

Also, user preference module 132 may receive user commands for controlling what devices are to be included in the synchronization group and for controlling what types of user content files are to be included in the synchronization group. Thus, user may wish to select a number of devices for synchronization, all of which are to share all data using a two-way synchronization at regular intervals or upon the change, deletion or addition of any file at any of the synchronization group devices. In the alternative, user may wish to a select certain device, for example camera/camcorder 120, for one-way synchronization, such that picture data or video files captured by camera/camcorder 120 are backed up by synchronization server 50 at regular intervals or upon the capture, change or deletion or such picture data or video files. At the same time, user may wish not to have two-way synchronization if user wishes to set the camera/camcorder 120 not receive user content from other devices for synchronization. In the alternative, user may wish to synchronize video files of the camera/camcorder 120 but not photographic images, or vice-versa.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A camera including a user content synchronization module for automatically synchronizing image data stored as camera records by the camera with central records stored for the user by a central node remote from the camera, the camera records and the central records comprising at least one of photo images or video files, the user content synchronization module comprising:
    a synchronization controller configured to initiate a current synchronization operation;
    a state comparator configured to identify, as a changed central record, any central records for the user changed, deleted or added since a last synchronization operation, and to identify, as a changed camera record, any camera records changed, deleted or added since the last synchronization operation, the last synchronization operation being a synchronization operation performed most recently prior to the current synchronization operation by the camera;
    the state comparator being further configured to determine whether the changed central record is a corresponding record to the changed camera record, the corresponding record being a record that refers to a different version of the same record than another record, and to identify, as a most recently modified record, only one record of a group consisting of the changed central record and the changed camera record; and
    a command generator configured to generate a command queue comprising a command to update based on the most recently modified record, the command being a command sent to the central node to update the central records for the user when the most recently modified record is the changed camera record, and the command being a command to the camera to update the camera records when the most recently modified record is the changed central record.

2. The camera of claim 1, wherein the camera is a camcorder configured to record video data.

3. The camera of claim 1, wherein the camera is a digital camera configured to record photo image data.

4. The camera of claim 1, wherein the camera is a device configured to record both video data and photo image data.

5. The camera of claim 1, wherein the user content synchronization module comprises a web access module configured to communicate with the central node via the internet.

6. The camera of claim 5, wherein the camera receives content data from the central node as XML data.

7. The camera of claim 1, wherein the camera comprises a wireless communication device configured to connect wirelessly with a Wi-Fi port remote from the camera.

8. The camera of claim 1, wherein the camera comprises a portal for a wired connection with an internet connection device having a web browser for connecting to the central node via internet.

9. The camera of claim 8, wherein the synchronization controller is configured to initiate automatically the current synchronization operation upon connection with the internet connection device.

10. The camera of claim 1, wherein the synchronization controller is configured to initiate automatically the current synchronization operation regularly after a predetermined time period.

11. The camera of claim 1, further comprising a user preference module configured to receive and to store a user-specified time period, wherein the predetermined time period is the user-specified time period and the predetermined time period is at least 30 minutes.

12. In combination, the camera of claim 1 and a processor-readable medium incorporating a program of instructions configured to run at the central node and configured to manage the central node during the current synchronization.

13. The combination of claim 12, wherein the program of instructions at the central node is configured maintain a deleted camera records folder comprising camera records deleted during the current synchronization operation and recallable upon user command.

14. The combination of claim 12, wherein the program of instructions at the central node is configured to maintain only thumbnail representations of the deleted camera records for the deleted camera records folder.

15. The combination of claim 12, wherein the program of instructions at the central node is configured to initiate the current synchronization operation by transmitting a synchronization operation start command to the user content synchronization module.

16. The combination of claim 12, wherein the program of instructions at the central node further comprises an off-line storage module configured to synchronize the central records with a second user device, the second user device being a device other than the camera.

17. The combination of claim 12, wherein the program of instructions at the central node further comprises a remote wiper configured to signal the user content synchronization module to delete all camera records.

18. The camera of claim 1, further comprising a user preference module configured to receive and to store a user designation of a selected set of camera records, the selected set of camera records being exempt from deletion or modification at the camera during the current synchronization operation.

19. The camera of claim 1, further comprising a user preference module configured to receive and to store a user selection of a thumbnail synch mode or a full record mode,
    wherein upon selection of the thumbnail synch mode, during the current synchronization operation the command generator is configured to store only a thumbnail representation of every camera record that remains in the camera after the current synchronization operation, and
    wherein the upon selection of the full record mode, during the current synchronization operation the command generator is configured to store an entire camera record of all camera records that remains in the camera after the current synchronization operation.

20. The camera of claim 19, wherein the user content synchronization module further comprises a thumbnail recall unit configured to generate, upon a user selection of a thumbnail representation, a request for the central node to transmit to the camera the central record corresponding to the thumbnail representation for viewing the central record on the camera.

21. In combination, the camera of claim 1 and a processor-readable medium incorporating a program of instructions configured to run on an internet connection device having a web browser for connecting to the central node via the internet, the program of instructions configured to manage the internet connection device to automatically connect with the camera via a wired or a wireless connection.

22. The combination of claim 21, wherein the synchronization controller is configured to initiate automatically the current synchronization operation upon connection with the internet connection device.

23. The camera of claim 1, wherein during the current synchronization operation, the command generator is configured to generate a thumbnail representation of every camera record that remains in the camera after the current synchronization operation.

24. The camera of claim 1, wherein during the current synchronization operation, the command generator is configured to retain a thumbnail representation of every camera record deleted from the camera during the current synchronization operation.

25. The camera of claim 1, wherein the synchronization operation module further comprises a thumbnail recall unit configured to generate, upon a user selection of a thumbnail representation, a request for the central node for transmitting to the camera a full image representation of the central record corresponding to the thumbnail representation for viewing the central record on the camera.

26. The camera of claim 1, further comprising a position relay module configured to transmit to the central node for storing in the central records for the user a current position of the camera.

27. The camera of claim 26, wherein the position relay module is configured to transmit the current position at a time of the current synchronization operation.

28. The camera of claim 26, wherein the position relay module is configured to retrieve the current position from a GPS unit integrated with, or in wired or wireless communication with, the camera.

29. The camera of claim 1, further comprising a location-based information module configured to provide guide information to the user based on a current position of the camera.

30. The camera of claim 29, wherein the current position of the camera is detected based on GPS information, based on cellular network triangulation, based on scene recognition of a scene viewed by the camera, or based on some combination of the foregoing.

31. The camera of claim 29, wherein the camera comprises sight recognition software to recognize a spot viewed by the camera and to provide the guide information based on the spot recognized.

32. The camera of claim 29, wherein the guide information is stored in the camera or downloaded from the central node.

33. The camera of claim 29, wherein the guide information is provided as a textual marquis or as an overlay.

34. The camera of claim 29, wherein the guide information includes information about surrounding structures or locations other than the sight immediately recognized.

35. The camera of claim 1, further comprising a filtering module configured to allow a user to recall saved photos or video files based on a date, time, location, or a combination of the date, time and location of capture of the image or video file.

36. The camera of claim 35, further comprising a tagging module configured to tag an image or a video file and to file the image or video file so as to be later recallable by the user by the tag.

37. The camera of claim 36, wherein the tagging module provides tags including date, time, location of capture, or a combination of date, time and location of capture.

38. A system including a camera comprising a user content synchronization module for automatically synchronizing image data stored as camera records by the camera with central records stored for the user by a central node remote from the camera, the camera records and the central records comprising at least one of photo images or video files, the user content synchronization module comprising:
  a synchronization controller configured to initiate a current synchronization operation;
  a state comparator configured to identify, as a changed central record, any central records for the user changed, deleted or added since a last synchronization operation, and to identify, as a changed camera record, any camera records changed, deleted or added since the last synchronization operation, the last synchronization operation being a synchronization operation performed most recently prior to the current synchronization operation by the camera;
  the state comparator being further configured to determine whether the changed central record is a corresponding record to the changed camera record, the corresponding record being a record that refers to a different version of the same record than another record, and to identify, as a most recently modified record, only one record of a group consisting of the changed central record and the changed camera record;
  a command generator configured to generate a command queue comprising a command to update based on the most recently modified record, the command being a command sent to the central node to update the central records for the user when the most recently modified record is the changed camera record, and the command being a command to the camera to update the camera records when the most recently modified record is the changed central record; and
  a user preference module configured to receive and to store user designation of at least one field of camera records, the user designated at least one field designating a set of camera records exempt from deletion or modification at the camera during the current synchronization operation or designating at least one selected field of camera records, the at least one selected field of camera records indicating the only set of camera records for synchronization.

* * * * *